(12) United States Patent
Conrads et al.

(10) Patent No.: US 6,802,339 B2
(45) Date of Patent: Oct. 12, 2004

(54) ASSEMBLY HAVING A SPRING-LOADED TANDEM CONTROL VALVE

(75) Inventors: Hermann-Josef Conrads, Herzogenaurach (DE); Erwin Laurer, Möhrendorf (DE); Jürgen Model, Erlangen (DE)

(73) Assignee: Framatome ANP GmbH, Erlangen (DE)

(*) Notice: Subject to any disclaimer, the term of this patent is extended or adjusted under 35 U.S.C. 154(b) by 0 days.

(21) Appl. No.: 10/650,056

(22) Filed: Aug. 26, 2003

(65) Prior Publication Data
US 2004/0154665 A1 Aug. 12, 2004

Related U.S. Application Data

(62) Division of application No. 09/687,971, filed on Oct. 16, 2000, now Pat. No. 6,644,346, which is a continuation of application No. PCT/DE99/01024, filed on Apr. 6, 1999.

(30) Foreign Application Priority Data
Apr. 14, 1998 (DE) .......................................... 198 16 463

(51) Int. Cl.[7] .............................................. F16K 17/10
(52) U.S. Cl. .................... 137/491; 137/489; 137/492.5; 251/26; 251/29
(58) Field of Search ................................ 137/489, 491, 137/492.5; 251/26, 29

(56) References Cited

U.S. PATENT DOCUMENTS

| 2,619,109 A | 11/1952 | Garrett et al. |
| 3,298,390 A | 1/1967 | De Graaf |
| 4,402,341 A | 9/1983 | Reip |
| 4,672,995 A | 6/1987 | Powell |
| 4,977,925 A | 12/1990 | Tiefenthaler |
| 5,590,684 A | 1/1997 | Alberts et al. |
| 6,386,228 B2 | 5/2002 | Conrads et al. |

FOREIGN PATENT DOCUMENTS

| DE | 455 133 | 1/1928 |
| DE | 39 06 888 A1 | 9/1990 |
| DE | 44 26 857 A1 | 2/1996 |

Primary Examiner—David A. Scherbel
Assistant Examiner—Ramesh Krishnamurthy
(74) Attorney, Agent, or Firm—Laurence A. Greenberg; Werner H. Stemer; Ralph E. Locher

(57) ABSTRACT

The fitting, in particular a safety valve, operates according to the relief principle or according to the loading principle. The fitting is opened and closed by a plurality of control parts. The control parts are connected in series in the control line of the fitting and are each actuated by a control valve. The control parts open the fitting only when all the control parts are in a position which opens the fitting. The fitting closes as soon as even only one of the control parts is in a position which closes the fitting.

8 Claims, 6 Drawing Sheets

ASSEMBLY HAVING A SPRING-LOADED TANDEM CONTROL VALVE

CROSS-REFERENCE TO RELATED APPLICATION

This is a division of U.S. application Ser. No. 09/687,971, filed Oct. 16, 2000, now U.S. Pat. No. 6,644,346, which was a continuation of International Application PCT/DE99/01024, filed Apr. 6, 1999, which designated the United States, and which was not published in English.

BACKGROUND OF THE INVENTION

Field of the Invention

The invention relates to an assembly comprising a fitting and a control device having at least two spring-loaded control valves which each actuate a dedicated control part, for opening the fitting which is opened by pressure relief by means of a control line.

These are fittings which are actuated by their own medium, preferably safety valves for reducing undesirable excess pressures in pressure lines or pressure vessels. The fittings which are actuated by their own medium are opened by a control valve when a critical pressure is reached in a pressure vessel or a pressure line and should be closed by the same control valve when the pressure falls below a critical level. The control valves are spring-loaded. The preferred application area for fittings which are controlled by their own medium in this way is in the primary circuit of nuclear power plants, in particular pressurized-water reactors.

Spring-loaded control valves per se are sufficiently well known in the prior at and are already supplied for these purposes by various companies. A safety valve of this type is known, for example, from German patent DE 455 133. In a control valve arrangement which operates on the relief principle, the system pressure (pressure in the pressure vessel) operates against a spring and an additional magnetic load and opens a pilot valve, downstream of which a nonreturn valve is arranged. As a result, a valve disc of this nonreturn valve is lifted counter to the force of a further spring and lifts a nonreturn valve cone out of its valve seat; as a result, the control line of a pressure-vessel safety valve is opened and the pressure in the control space of the safety valve is relieved. The safety valve opens. It closes again when the system pressure has fallen sufficiently far for the pilot valve and the nonreturn valve to close.

The valve arrangement of a second manufacturer operates on the loading principle. It essentially comprises only a valve with spring and magnetic loads (similar to the above-mentioned control valve) and—as soon as a setpoint has been reached—passes a mass flow out of the pressure vessel into the control line, which leads to the control space of the safety valve and presses it open.

The control valve produced by a third manufacturer actuates a plurality of valve bodies which are connected to one another and which are used both to pressurize the control space of the safety valve (closure of the safety valve) and to relieve the pressure on this control room (opening).

Spring-loaded control valves have a relatively high probability, which does not correspond to that of the main fitting, of failing to close. The inability of a spring-loaded control valve to close is $10^{-2}$/demand, i.e. the is probability is that the valve will fail to close once in only 100 demands. By contrast, the probability that the main fitting will fail to close is $10^{-4}$/demand. However, the relatively high probability that the control valve will fail to close means that the low probability of the main fitting failing to close has no effect.

Even with a relatively recent internal development of a control valve, the probability of the valve failing to close is still not entirely satisfactory. In this device, a pressure-displacement converter is connected to a control valve, the pressure-displacement converter being mechanically connected to a filling cone and to a relief cone, and both cones being moved in the same direction. In a first step, the filling cone can be moved onto a seat by a relatively low force, with the result that a control line of the control valve is blocked. In a second step, only a relatively high force is able to lift the relief cone off its seat, with the result that the control line of the control part is connected to a line which is open to atmosphere and the pressure on the safety valve is relieved (i.e. the valve is opened).

Theoretical calculations revealed that the probability of control valves failing to close can be reduced by connecting a combination of these control valves in series. By way of example, connecting two valves in series would lead to a probability of $(10^{-2})^2$/demand, i.e. of $10^{-4}$ per demand, of failure to close. A closure failure probability of this level is very similar to the closure failure probability of the main fitting.

Engine control valves which are connected in series are known in the prior art. They are in some cases also used in combination with a primary circuit safety valve. However, since these engine control valves operate on the working principle, according to the relevant safety regulations they should not be used on their own. For example, German Regulations TRD 421 state that if there are three safety valves protecting a pressure vessel, only one safety valve may have control valves which operate on the working principle. The other two safety valves which are present must have control devices which operate on the static principle.

The only known series-connected control valves which operate on the static principle are solenoid valves. However, these valves cannot be used in the primary circuit of a nuclear power plant, since they may open in the event of a voltage loss.

Known spring-loaded control valves, as described in the introduction, for example, cannot be connected in series on account of their design. For this reason, spring-loaded control valves are currently generally only used in single control valve arrangements in the primary circuit, i.e. even if a plurality of valves are provided, ultimately only a single control part which applies or relieves the load on the safety valve is present in the control line of the safety valve. The relatively high probability of the valve failing to close is accepted as inevitable.

SUMMARY OF THE INVENTION

The object of the invention is to provide a spring-loaded tandem control valve which overcomes the above-noted deficiencies and disadvantages of the prior art devices and methods of this kind, and which specifies a control device for a fitting which, although it may contain loading springs, nevertheless leads to a low probability of the fitting failing to close.

With the above and other objects in view there is provided, in accordance with the invention, an assembly, comprising:

a fitting communicating with a control line and being opened by pressure relief via the control line;

a control device having at least two spring-loaded control valves each actuating a dedicated control part, for opening the fitting by pressure relief via the control line;

wherein the control parts are arranged at the control line and are configured to open the fitting only when all the control is parts are in a position in which the load on the fitting is relieved, and the control parts closing the fitting as soon as a single one of the control parts is in a position imposing a load on the fitting.

In an alternative embodiment, there is provided, in accordance with the invention, an assembly, comprising:

a fitting communicating with a control line and being opened by pressure imposed via the control line;

a control device having at least two spring-loaded control valves each actuating a dedicated control part, for opening the fitting by pressure imposed via the control line;

wherein the control parts are arranged at the control line and are configured to open the fitting only when all the control parts are in a position in which a load is imposed on the fitting, and the control parts closing the fitting as soon as a single one of the control parts is in a position relieving the load on the fitting.

In other words, the invention specifies a control device by means of which a fitting, in order to be opened, can either be relieved or loaded by means of a control line, i.e. the fitting can operate either according to the relief principle or according to the loading principle. The control device may also operate without additional electromagnetic or other loads.

To achieve the above and other objects of the invention, the control device has at least two spring-loaded control valves as well as the same number of control parts. Each of the control parts is assigned to one of the control valves and is connected thereto. According to the invention, the control parts are arranged on the control line. A fitting operating on the relief principle opens when, and only when, all of the control parts are in a position in which the load on the fitting is relieved. The fitting closes as soon as even only one of the control parts is in a situation in which load is applied to the fitting. If the fitting is operating according to the loading principle, it opens when, and only when, the control parts are in a position in which they apply a load to the fitting and closes again as soon as even only one of the control parts is in a position in which it relieves the load on the fitting.

The invention works on the basis that the probability of the fitting failing to close is reduced in accordance with the rise in number of independently operating control parts when each control part on its own closes the fitting. A combination of independently acting control parts therefore enables the probability of the fitting failing to close to be improved considerably. For example, the combination of two control parts with a closure failure probability of in each case $10^{-2}$/demand results in an overall closure failure probability of $(10^{-2})^2$/demand, i.e. of $10^{-4}$ per demand. As a result, the failure closure probability of the fitting also corresponds to that of the combined control parts.

The control parts advantageously contain valves which are actuated by the associated control valves and are connected in series in the control line of the fitting. In this case, each of the control parts has a first port (the "control port" which is connected to the associated control valve via a control passage) and two further ports ("working ports", by means of which the control part is integrated into the control line of the fitting). Therefore, a working port of each control part is connected to the fitting either directly (for example via a feed line) or via one or more control parts (i.e. indirectly). Therefore, only a single control part is directly connected to the fitting via a working port, while the other working port of this control part is connected to a working port of another control part. This arrangement is referred to as a "series connection" or a "tandem valve", since a pressure medium coming from the fitting or flowing toward the fitting successively passes through a plurality of the control parts.

Furthermore, it is considered advantageous that the respective control valves and/or control parts are of the same design. This restricts fabrication and stock to a few components and makes construction and assembly easier.

In accordance with an added feature of the invention, at least one of the control valves of the control device has a pressure-displacement converter. This pressure-displacement converter, a filling cone and relief cone are arranged in such a manner that they interact mechanically with one another (at least in some positions are for example, connected to one another) and can be displaced simultaneously in the same direction. In a first chamber, the filling cone is arranged in such a manner that it can be displaced onto a valve seat ("filling cone seat") by a relatively low force. It is used to block off or open a pressure-carrying connection line, which opens out into the first chamber, with respect to a control passage, which connects this first chamber to the control part. The relief cone is arranged in a second chamber and can be lifted off a corresponding valve seat ("relief cone seat") by a relatively great force. As a result of the relief cone being lifted off its seat, a connection is produced between the passage which leads from the control part to the first chamber and the space above the first seat, on the one hand, and a control valve drain (e.g. an outlet line which is open to atmosphere) on the other hand.

In accordance with a particularly advantageous feature of the invention, at least one of the control valves of the control device is designed as proposed in the copending German application 196 28 610.7-12. In this case, the pressure-displacement converter together with the filling cone and the relief cone is arranged on a common central axis. The arrangement is designed in such a way that filling cone and relief cone can be mechanically connected to the pressure-displacement converter and can be displaced in the same direction as the converter (i.e., for example, simultaneously).

The pressure-displacement converter is particularly advantageously provided with a plunger. At its lower end, this plunger is connected to the pressure-displacement converter. The upper end of the plunger is situated beneath and in the immediate vicinity of the relief cone. It can be displaced in such a way that, when suitably displaced, it touches the underside of the relief cone. The plunger is guided in an extension of the filling cone. The second chamber having the seat of the relief cone is situated in the interior of the filling cone.

Other features which are considered as characteristic for the invention are set forth in the appended claims.

Although the invention is illustrated and described herein as embodied in a spring-loaded tandem control valve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE PREFERRED EMBODIMENTS

Figure 1:
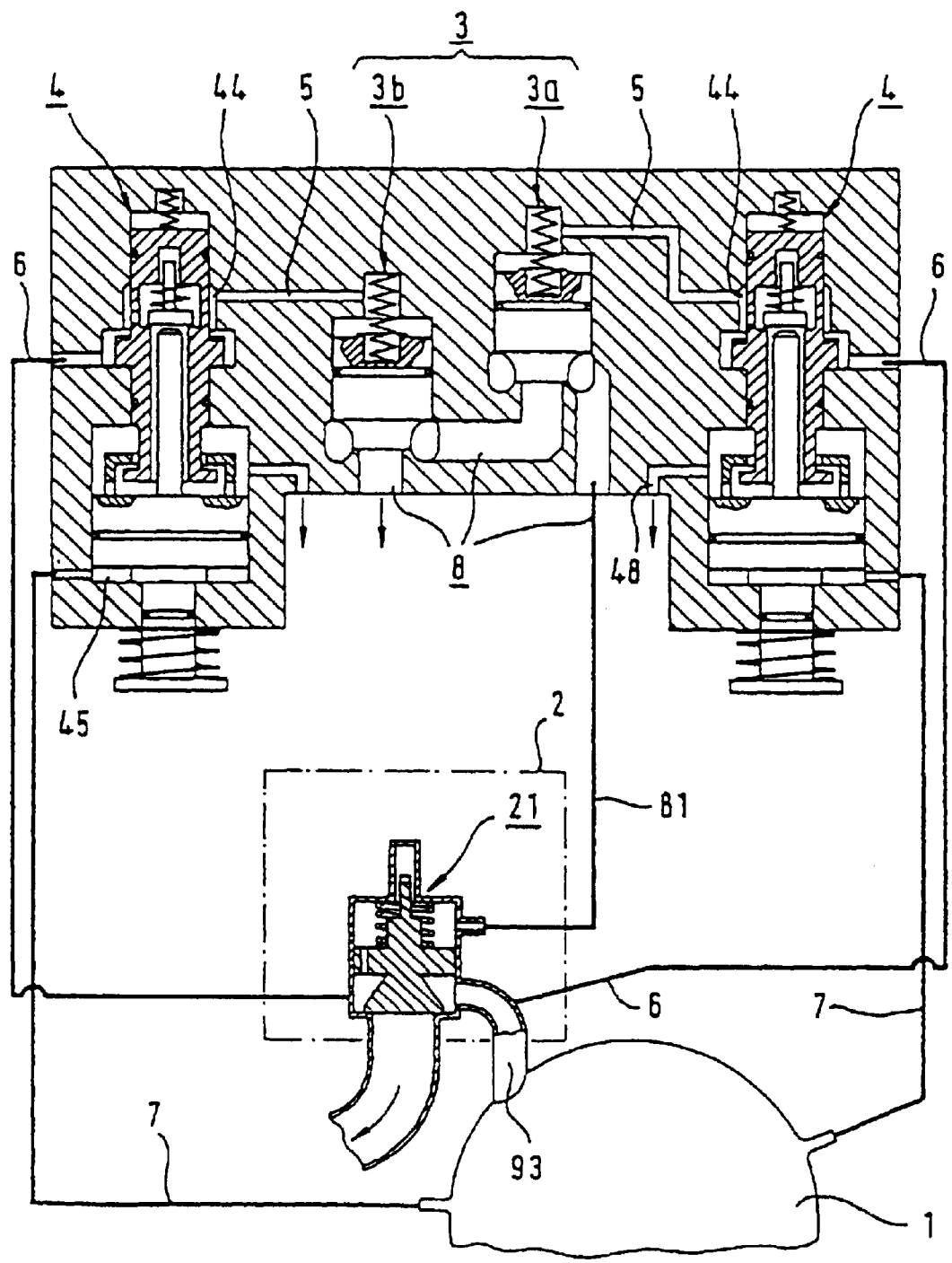
FIG. 1 is a partly sectional, partly diagrammatic view of a spring-loaded tandem control valve which operates according to the relief principle, with a safety valve.
Figure 1A:
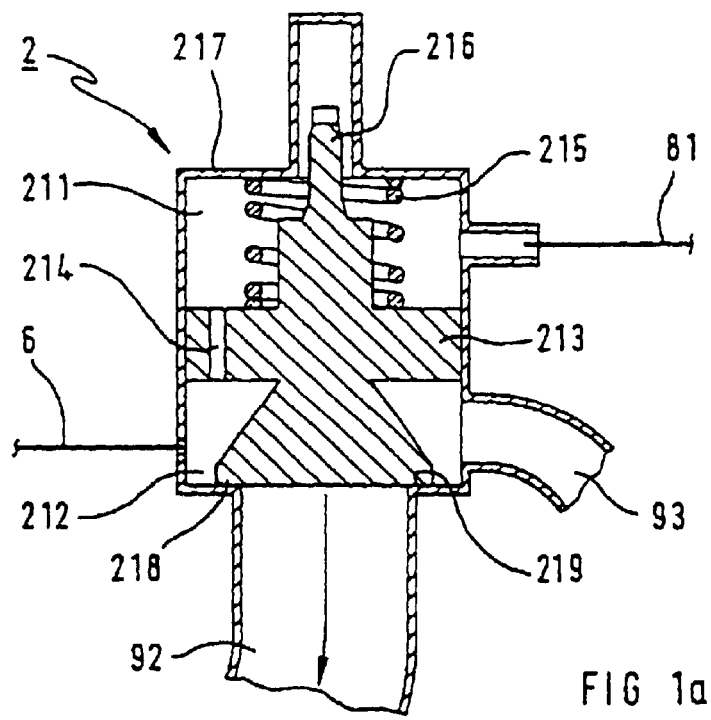
FIG. 1a is an enlarged sectional view of the safety valve and FIG. 1b is an enlarged sectional view of the control parts.
Figure 1B:
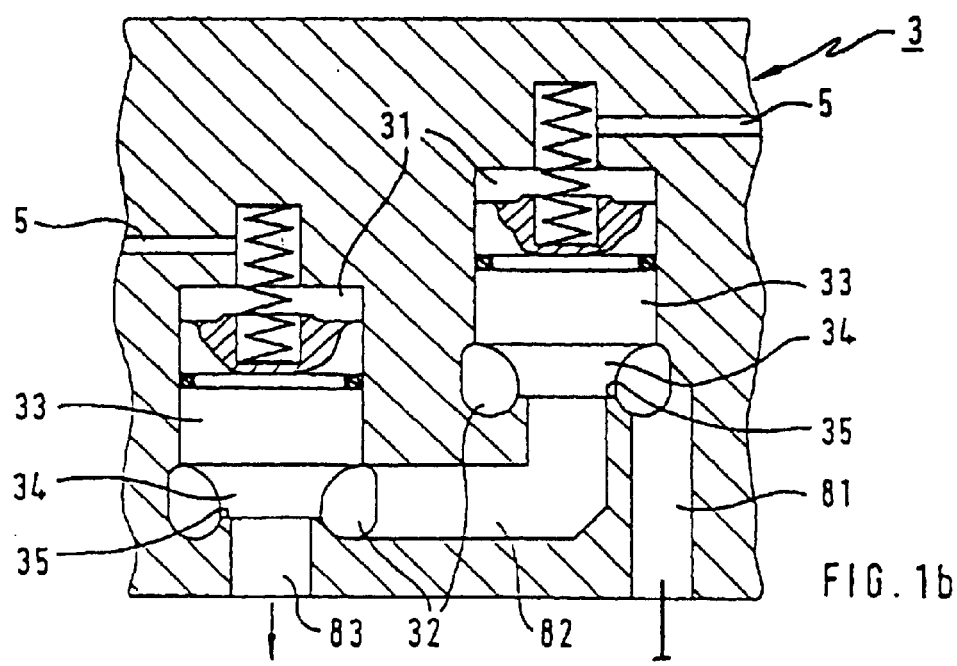

Referring now to the figures of the drawing in detail and first, particularly, to FIG. 1 and FIGS. 1a, 1b thereof, there is seen a control device for a safety valve 2. The safety valve 2 of the exemplary embodiment serves to relieve the pressure in a (reactor) pressure vessel 1. The safety valve 2 in this exemplary embodiment is a safety valve 21 which operates according to the relief principle (FIG. 1a). To control the safety valve 2, in each case two control valves 4 and control parts 3 (FIG. 1b) are provided. To make the drawing clearer, the control parts 3 and control valves 4 are shown on a much larger scale than the safety valve 2. For the same reason, the pressure vessel 1 is only diagrammatically indicated on a scale which is considerably smaller than that is used for the safety valve 2.

An assembly in which a safety valve 2 is controlled by in each case two control parts 3 and control valves 4 is referred to as a "tandem configuration."

The safety valve 21 which operates according to the relief principle is connected to the pressure vessel 1 via a pressure line 93. The pressure line 93 opens out into a lower valve space 212. The lower valve space 212 is separated from an 25 upper valve space 211 (the "control space" of the valve) by a valve plate 213. The upper valve space 211 and lower valve space 213 are in communication with one another via a hole 214 which leads through the valve plate 213. To assist the closure force, a valve spring 215 is arranged above the valve plate 213, one end of which spring rests on the valve plate 213 and the other end of which spring rests against the valve housing wall 217. In the closed position of the valve, the pressure outlet line 92 is closed off by the valve cone 218. The lower end of this valve cone 218 rests on the valve seat 219.

A relief line 81, which is part of a control line 8 of the safety valve 21, connects the upper valve space 211 to a working port on the bottom space 32 of a first control part 3a, which likewise constitutes a valve. This lower space 32 is separated from an upper space 31 of this first control part 3a by a control-part piston 33, the lower end of which is of frustoconical design. The lower end 34 of the control-part piston 33 closes off an intermediate line 82, which as a further part of the control line 8 serves to connect the lower space 32 of the control part 3a to the upper space 32 of a second control part 3b. This control part 3b is of the same type as the control part 3a. It has a control-part piston 33 which separates the lower space 32 of the control part 3b from its lower space 31. This control-part piston 33 likewise has a frustoconical lower end 34. This frustoconical end 34 closes off an outlet line 83 which belongs to the control-line system 8, starts from the lower space 32 of the control part 3b and, as the end of the control line 8, leads to the outer space of the control device or a drain.

The upper spaces 31 of the control parts 3a and 3b are connected to the control valves 4 via intermediate passages 5. The control passages 5 open out into a first chamber 44 of the control valves 4. This first chamber 44 is connected, via a connection line 6, to either the lower valve space 212 directly or to the pressure line 93, which likewise opens out into the lower valve space 212. A second chamber 45 of the control valves 4 is connected to the pressure vessel 1 via connection lines 7.

Under normal operating pressure, the safety valve 21, which operates according to the relief principle, is closed, i.e. the valve cone 218 is situated on the cone seat 219. In the control line system 8, the relief line 81 is subjected to pressure. This pressure also acts on the top side of the valve plate 213, so that the valve cone 218 is pressed onto its seat 219. The pressure in line 81 and the upper valve space 211 is continuously built up as a result of the upper valve space 211 being in communication with the lower valve space 212 via the hole 214 in the valve plate 213. Since, in the closed position of the safety valve 21 which operates according to the relief principle, the lower end 34 of the control-part piston 33 of the control part 3a blocks off the relief line 81 with respect to the intermediate line 82 and therefore also with respect to the outlet line 83, the pressure which has built up in line 81 and the upper valve space 211 cannot escape and therefore acts on the top side of the valve plate 213. Since the sum of the surface areas which are active for the closure pressure, namely the surface area of the valve plate 213, that of the valve guides 216 situated on the valve plate 213 and that of the valve cone 218, is larger than the surface area which is active for the counter-pressure on the underside of the valve plate 213, the valve cone 218 is pressed onto its valve seat 219. The closed position is supported by the valve spring 215.

The closed position of the safety valve 21, which operates according to the relief principle, can only be reached as a consequence of a pressure build-up in the relief line 81. For this to happen, it is necessary for the relief line 81 to be blocked off with respect to the outlet line 83. The relief line 81 is blocked off from the outlet line 83 in such a manner that the control line system 8 is closed at least by one of the control parts 3. In the normal situation, the control line system 8 is closed by both control parts 3. In this case, the frustoconical lower ends 34 of the control-part pistons 33 are bearing against a seat 35. As a result, the intermediate line 82 is blocked off from the first line 81 by the first control part 3a and the intermediate line 82 is blocked off from the outlet line 83 by the other control part 3b. The blocking takes place in such a manner that pressure is applied to the upper spaces 31 of the control parts 3 and, as a result, the lower ends 34 of the control-part pistons 33 are pressed onto the seats 35.

If the pressure in the pressure vessel then reaches a critical level, the pressure in the upper spaces 31 of the control parts 3 is relieved by the control valves 4. Since the lower space 31 of the first control part 3a is in communication with the relief line 81 and is therefore exposed to pressure, the control-part piston 33 of the first control part 3a is pressed upward off its seat 35. The pressure which is present in the is relief line 81 can then spread through the intermediate line 82 into the lower space 32 of the second control part 3b. Since the pressure in the upper chamber 31 of the second control parts 3b has also been relieved by the control valve 4 associated with the control part 3b, the control-part piston 33 of the second control part 3b is pressed upward out of its seat 35. As a result, the outlet line 83 is opened. A connection through which pressure can pass is formed between the upper valve space 211 of the safety valve 21, which operates according to the relief principle, and the space surrounding the control device. As a result, the pressure on the upper valve space 211 is relieved. The safety valve 21 opens on account of the pressure prevailing in the lower valve space 212. When the valve 21, which operates according to the relief principle, opens, the valve cone 218 is removed from its cone seat 219, so that a connection is formed between the pressure line 93 and the pressure outlet 92. Medium can escape from the pressure vessel 1 via the pressure line 93 and the pressure outlet line 92, and as a result the pressure in the pressure vessel 1 can be reduced.

If the pressure in the pressure vessel 1 falls below a certain preset level, pressure is applied to the upper spaces 31 of the control parts 3 by the control valves 4. As a result, the lower ends 34 of the control-part pistons 33 are pressed onto the seats 35. Consequently, the passages from the relief line 81 to the intermediate line 82 and from the intermediate line 82 to the outlet line 83 are blocked. A pressure builds up in the upper valve space 211 and in the first line 81 through the hole 214 in the valve plate 213 of the safety valve 21, which operates according to the relief principle, and this pressure presses the valve cone 218 onto the cone seat 219. The safety valve 21, which operates according to the relief principle, closes.

If—for whatever reason—one of the two control parts 3 fails, the control line system 8 is still closed by at least one of the control parts 3. As a result, a pressure which presses the valve cone 218 onto its cone seat 219 can build up in the upper valve space 211.

Figure 2:
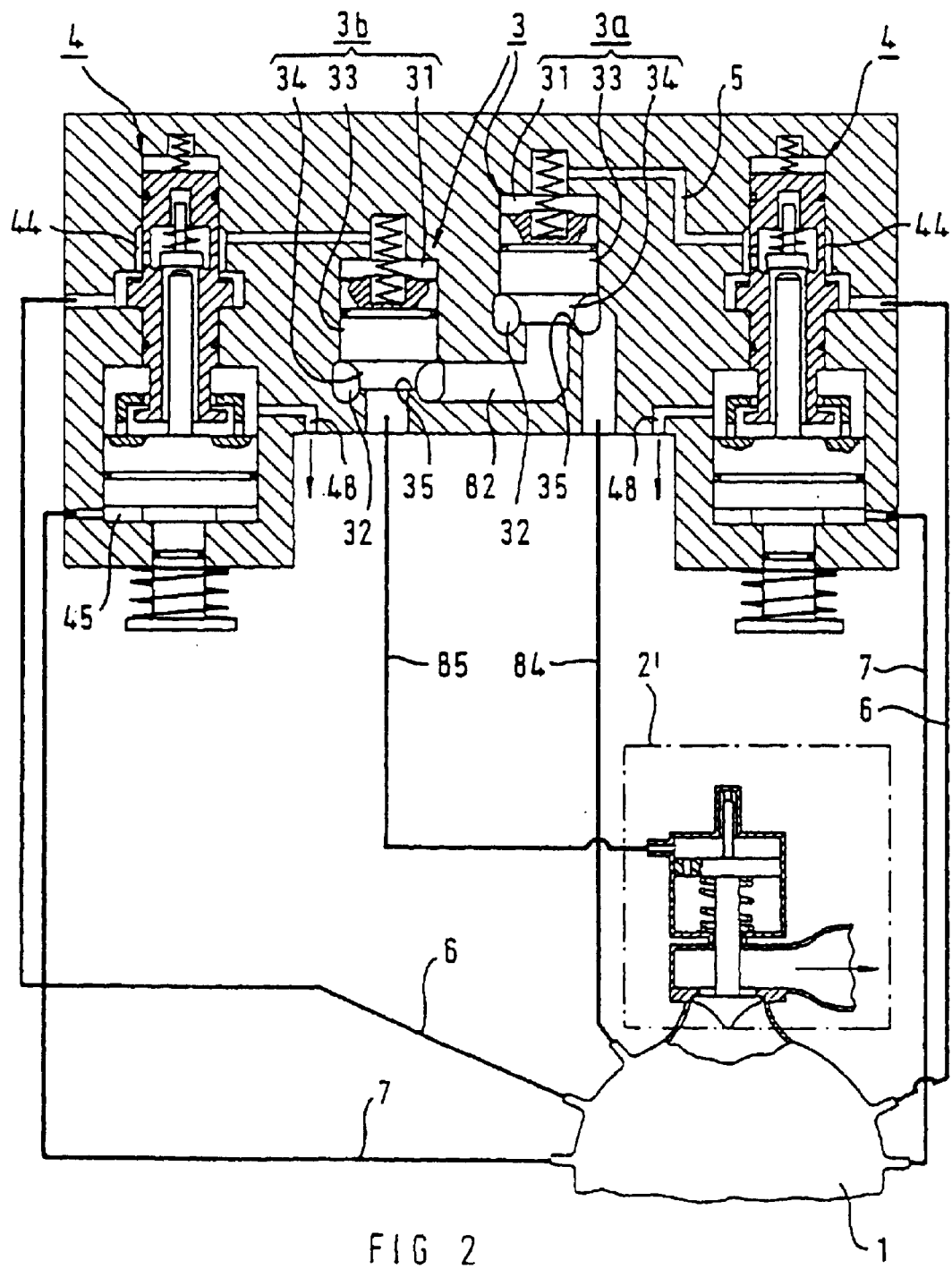
FIG. 2 is a partly sectional, partly diagrammatic view of a spring-loaded tandem control valve which operates according to the loading principle.
Figure 2A:
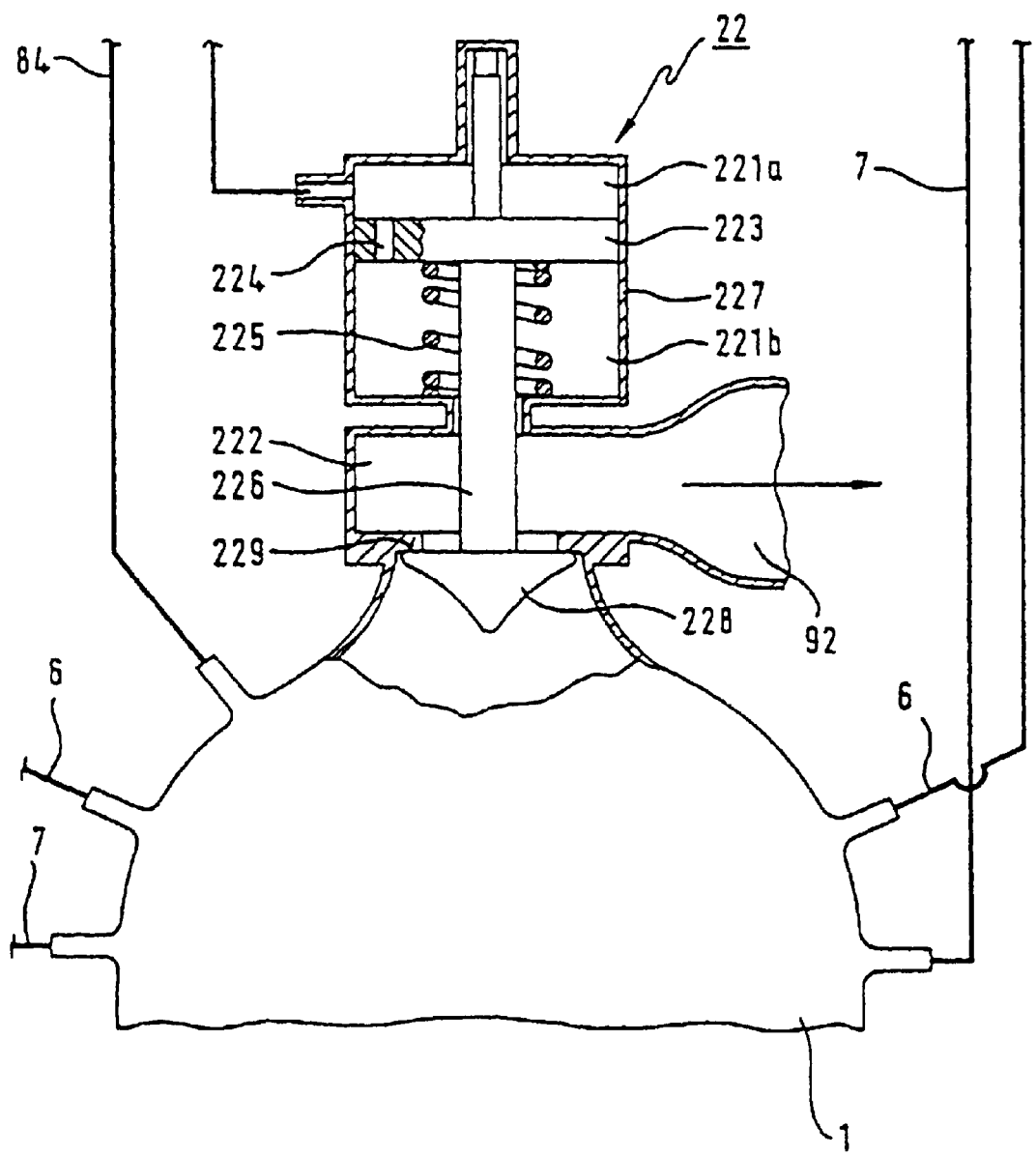
FIG. 2a is an enlarged view of the corresponding safety valve.

FIG. 2 shows a tandem control valve arrangement which operates according to the loading principle. On a pressure vessel 1 there is a safety valve 2', this safety valve 2' being a safety valve 22 which operates according to the loading principle (FIG. 2a). This safety valve 22, which operates according to the loading principle, is controlled by two identical control parts 3, each of which is connected to a control valve 4. The two control valves 4 are of identical construction.

For reasons of clarity, the safety valve 22, which operates according to the loading principle, is shown on a larger scale than the pressure vessel 1 and on a smaller scale than the control parts 3 and the control valves 4.

The safety valve 22, which operates according to the loading principle, is connected to the pressure vessel 1. It has a lower valve space 222 to which a steam outlet line 92 is connected. In the closed position of the valve, the lower valve space 222 is closed off from the pressure vessel 1 by a valve cone 228 which is pressed onto its seat 229 by the pressure prevailing in the pressure vessel 1. On the valve side of the valve cone 228, a valve plunger 226 is arranged on said cone, which plunger leads through the lower valve space 222 into an upper valve space 221. At the upper end of the valve plunger 226 there is a valve plate 223 which divides the upper valve space 221 into an upper half-space 221a and a lower half-space 221b. The valve plate 223 is provided with a hole 224 through which the upper half-space 221a is in communication with the lower half-space 221b. A spring 225 which surrounds the valve plunger 226 is arranged in the lower half-space 221b, between the underside of the valve plate 223 and the base of the upper valve space 221. The upper valve space 221 is separated from the lower valve space 222 by a constriction in the valve housing wall 227.

The pressure vessel 1 is connected to a lower space 32 of a first control part 3a via a first line 84 which forms part of a control line 8. When the plant is operating normally, i.e. when the safety valve 2 is in its closed position, this lower space 32 of the first control part 3a is closed off from an intermediate line 82, which likewise forms part of the control line 8, by a frustoconical lower end 34 of a control-part piston 33, the intermediate line 82 opening out in a lower space 32 of a second control part 3b. The lower space 32 of the second control part 3b has a loading line 85, which likewise forms part of the control line 8 and connects said lower space 32 to the upper half-space 221A of the upper valve space 221. When the plant is operating normally, this loading line 85 is also blocked off from the lower space of the second control part 3b by the frustoconical lower end 34 of a control-part piston 33 of the control part 3b.

As in FIG. 1, the control parts 3 are each connected to a first chamber 44 of a control valve 4 via a control passage 5. This first chamber 44 of the control valves 4 is in communication with the pressure vessel 1 via a connection line 6. Furthermore, the control valves 4 have a second chamber 45 which is likewise connected to the pressure vessel 1, via connection lines 7.

In the normal operating state of the pressure vessel, the safety valve 22, which operates according to the loading principle, is closed. The upper valve space 221 is free from pressure, as is the loading line 85 which is connected thereto and connects the upper valve space to the lower space 32 of the control part 3b. The intermediate line 82, which connects the lower spaces 32 of the control parts 3a and 3b, is also free from pressure. By contrast, the first line 84, which connects the pressure vessel 1 to the lower space 32 of the first control part 3a, is under the same pressure as the pressure vessel 1. To ensure that the control-part piston 33 of the first control part 3a is not lifted off its seat 35 by the pressure prevailing in its lower space 32, pressure is applied to this control-part piston 33 in an upper space 31.

Likewise, pressure is applied to the control-part piston 33 of the control part 3b in an upper space 31. This pressure stems from a connection of the upper space 31 of the control parts 3 via the control passages 5, the first chambers 44 of the control valves 4 and the connection lines 6 to the pressure vessel 1.

If the pressure in the pressure vessel rises beyond a critical level, the pressure in the space 31 of the control parts 3 is relieved by the control valve 4. On account of the pressure prevailing in the lower space 32 of the first control parts 3a via the first line 84, the control-part piston 33 is pressed upward off its seat 35. As a result, the pressure which is present in the first line 84 and is coming from the pressure is vessel 1 can extend into the intermediate line 82 and pressure can be applied to the lower space 32 of the second control part 3b. As a result of this application of pressure, the control-part piston 33 of this second control part 3b is then pressed upward off its seat 35. As a result, the loading line 85 is opened, so that the pressure can extend further until it reaches the upper half-space 221a of the upper valve space 221, where this pressure acts on the valve plate 223 and presses it downward. The valve cone 228 is pressed downward off its cone seat 229 via the valve plunger 226, which is connected to the valve plate 223. The safety valve 22, which operates according to the loading principle, opens. Medium from the pressure vessel 1 then flows into the lower valve space 222, where it is discharged via the steam outlet line 92. As a result, the pressure in the pressure vessel 1 falls. If the pressure falls below a certain level, pressure is applied to the upper space 31 of the control parts 3 via the control valves 4. The frustoconical lower end 34 of the control-part piston 33 is pressed onto its seat 35. As a result, the application of pressure to the upper half-space 221a of the upper valve space 221 is ceased. Pressure which is still present in the upper half-space 221a and in the loading line 85 then escapes via the hole 224 into the lower half-space 221b. As a result of the pressure coming from the pressure vessel 1, the valve cone 228 is pressed back onto its cone seat 229, and the safety valve 22, which operates according to the loading system, closes.

If—for whatever reason—one of the control parts 3 should fail, the control line system 8 is still blocked by a single one of the control parts 3. This ensures that even if one control part 3 fails, a safety valve 22, which operates according to the loading principle, is returned to the closed position.

Figure 3:
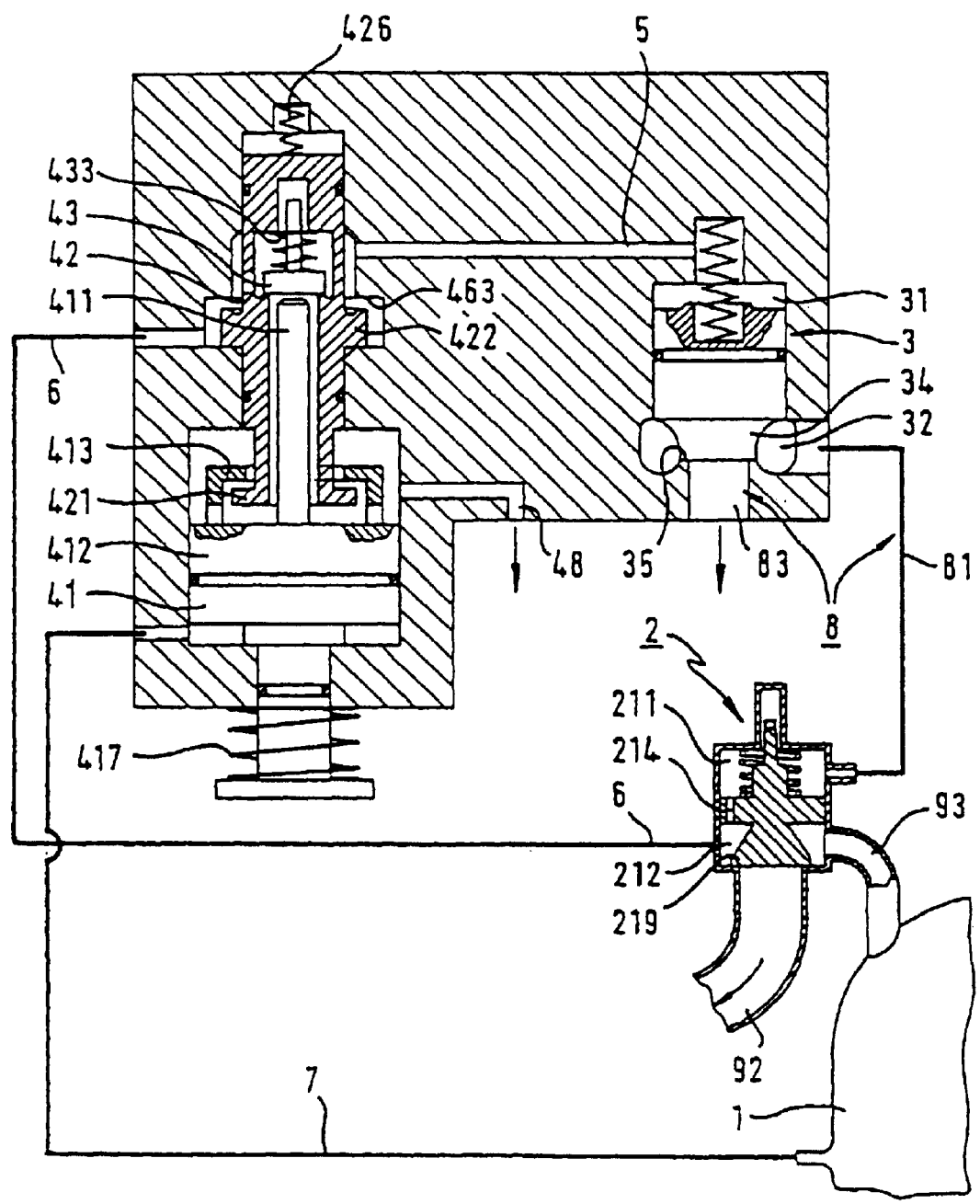
FIG. 3 is a partly sectional, partly diagrammatic view of an individual control valve with a safety valve that operates according to the relief principle.
Figure 3A:
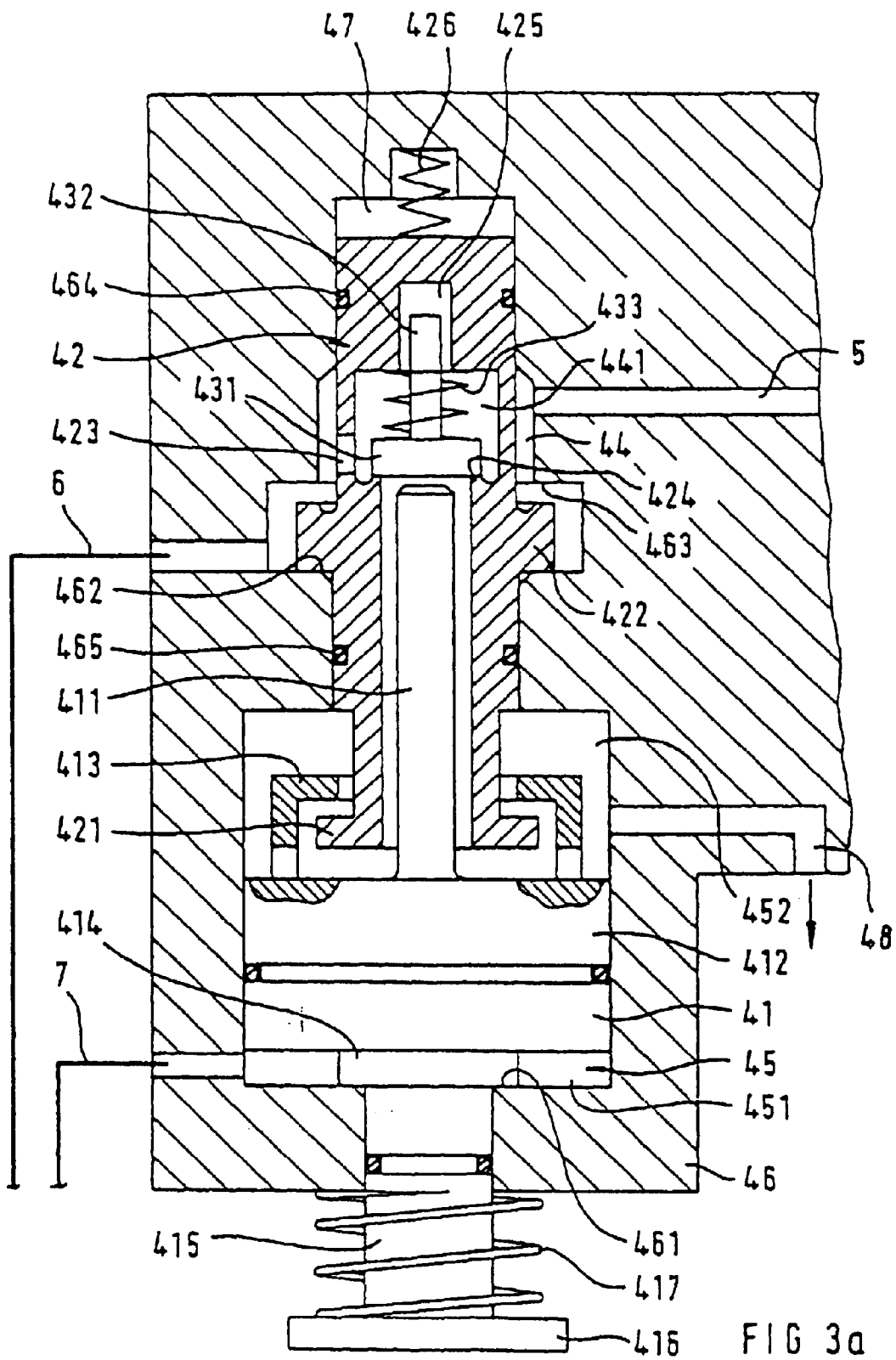
FIG. 3a is an enlarged sectional view of the individual control valve in FIG. 3.

The way in which the control parts 3 are controlled by the control valves 4 is identical irrespective of whether the safety valve 2 operates according to the loading principle or the relief principle. Since the two control parts 3a and 3b and the associated control valves 4 are in each case identical, it is sufficient for the design and function of in each case one control valve 4 and one control part 3 to be explained. FIG. 3 illustrates a control valve 4 and a control part 3 together with a safety valve 2 which operates according to the relief principle. The figure also shows part of a pressure vessel 1. To make it easier to explain the way in which control valve 4 and control part 3 function, the series connection of the control parts 3 is not illustrated here.

The safety valve 2 is designed as explained with reference to FIG. 1. It is connected to a lower chamber 32 of the control part 3 by a relief line 81 which forms part of a control line 8. In the closed position of the safety valve 2, the lower end 34 of the control-part piston 33 is situated on the seat 35. As a result, the outlet line 83, which likewise forms part of the control line 8, is blocked off from the lower space 32 of the control part 3 and therefore from the relief line 81. The outlet line 83 leads into a pressure-free space outside the control device.

The upper space 31 of the control part 3, which is divided from the lower space 32 by the control-part piston 33, is connected to a first chamber 44 of the control valve 4 via an intermediate passage 5. For its part, this first chamber 44 is connected, via a connection line 6, to the lower valve space 212 of the safety valve 2 and is therefore in communication with the pressure vessel 1 via the pressure line 93. Alternatively, it is also possible for the connection line 6 not to lead via the safety valve 2, but rather to be directly connected to the pressure vessel 1.

The control valve 4 has three main components: a pressure-displacement converter 41, a filling cone 42 and a relief cone 43. The converter piston 412 of the pressure-displacement converter 41 is situated in a second chamber 45 of the control valve 4. It divides this second chamber 45 into a lower half-space 451 and an upper half-space 452. The converter piston 412 is arranged displaceably in the second chamber 45. On its underside there is a first plate 414, the horizontal dimensions of which are smaller than those of the converter piston 412. The lower part of this plate 414 rests on a shoulder 461, which is formed by the inner wall of the housing 46 of the control valve 4. This ensures that in the event of displacement of the converter piston 412, the lower half-space 451 of the second chamber 45 always has a minimum volume. This lower half-space 451 of the second chamber 45 is connected via a connection line 7 to the pressure vessel 1, which opens out in the region of the minimum volume.

A bolt 415 which leads through the wall of the housing 46 adjoins the underside of the first plate 414. Part of this bolt 415 projects into the space outside the housing 46. At its end there is a second plate 416. A powerful spring 417 is arranged between this plate 416 and the outer wall of the housing 46. The spring force of the spring 417 counteracts the displacement of the converter piston 412 in the upward direction. The spring force is, for example, 13 kN.

A converter plunger 411 is arranged on the top side of the converter piston 412. This converter plunger 411 is guided through a cylindrical extension of the filling cone 42.

If the first plate 414 of the pressure-displacement converter 41 is on the shoulder 461—the position which corresponds to normal operation of the plant—the converter plunger 411 ends just below the relief cone 43.

At its lower end, the cylindrical extension of the filling cone 42 has claws 421. These claws 421 are designed in such a way that they can be acted on by claws 413 arranged on the top side of the converter piston 412.

When the plant is operating normally, a seat stop 422 of the filling cone 42 is situated on a (lower) filling cone seat ("filling cone stop") 462, which is formed by the housing 46.

To the side of the filling cone seat 462 is situated the connection of the connection line 6 to the first chamber 44. This first chamber 44 is delimited by the outer wall of the filling cone 42 in the region above the seat stop 422 and the adjacent inner wall of the housing 46. This first chamber 44 is connected to an inner chamber 441 via a passage 423 in the wall of the filling cone 42. This inner chamber 441 is designed as a cavity in the filling cone 42 and surrounds the relief cone 43. In its lower region, this relief cone 43 has a relief cone piston 431, the lower edge of which is arranged, in the normal state of the plant, on a relief cone seat 424 formed by a shoulder of the filling cone 42. Above the relief cone piston 431, the relief cone 43 has a relief cone bolt 432 which, directed upwardly, engages in a cutout 425 in the is filling cone 42. A spring 433, a low spring force of which presses the relief cone 43 onto its relief cone seat 424, is arranged between the inner wall of the filling cone 42 on the upper end of the inner chamber 441 and the top side of the relief cone piston 431.

Above the filling cone 42 is a third chamber 47 which is formed by the upper outer wall of the filling cone 42 and the inner wall of the housing 46. Inside this third chamber there is a spring 426 which with a low spring force presses the filling cone 42 against the filling cone stop 462.

In the normal state of the pressure vessel 1, the latter is under a pressure of, for example, 150 bar. This pressure of the pressure vessel 1 is passed on to the lower half-space 451 of the second chamber 45 via the connection line 7. This pressure acts on the pressure-displacement converter 41 and seeks to press the latter upward. However, the movement of the pressure-displacement converter 41 is prevented by the force from the strong spring 417 driving it downward.

The pressure in the pressure vessel 1 is passed via the connection line 6, through the first chamber 44 and the intermediate passage 5, to the upper space 31 of the control part 3. As a result, the frustoconical lower end 34 of the control-part piston 33 is pressed downward onto the seat 35.

The pressure stemming from the pressure vessel also acts in the first chamber 44 and the inner chamber 441. However, on the filling cone 42 this pressure has the effect of balancing forces, since the sealing elements 464, 465 (e.g. bellows) above and below the chambers 44 and 441 each seal the same cross section.

When the plant is operating normally, only the relatively weak spring 426 (the spring resistance of bellows would also be possible) presses the filling cone 42, by means of its seat stop 424, onto the stop 462 of the housing 46.

The upper half-space 452 of the second chamber 45 and the third chamber 47 are free from pressure.

If the pressure in the pressure vessel 1 rises, the pressure in those spaces which have been referred to being exposed to pressure therefore rises at the same time and by the same amount. The pressure-displacement converter 41 is pressed upward until its converter plunger 411 comes into contact with the underside of the relief cone piston 431 of the relief cone 43. If the pressure in the pressure vessel 1 rises further, the pressure-displacement converter 41 pushes the filling cone 42 upward via the converter plunger 411 and the relief cone 43. The relief cone piston 431 of the relief cone 43 remains on the relief cone seat 424, since the hydraulic closure force prevailing on account of the pressure in the inner chamber 441 does not allow it to be lifted off the relief cone seat 424. The lifting operation of the filling cone continues as the pressure in the pressure vessel rises further until the upper part of the seat stop 422 of the filling cone is pressed onto the upper filling cone seat 463. As a result of the seat stop 422 being pressed onto the upper filling cone seat 463, the connection between the connection line 6 and the first chamber 44 is interrupted. There is no further pressure compensation between the pressure vessel 1 and the first chamber 44 and the intermediate channel and the upper space 31 of the control part 3. However, the pressure which has prevailed therein hitherto is retained.

Therefore, as the pressure in the pressure vessel 1 rises further, only the pressure in the lower half-space 451 of the second chamber 45 continues to rise, since this lower half-space is in communication with the pressure vessel via the connection line 7. At a response pressure of, for example, 176 bar, the pressure-displacement converter 41 is moved further upward and its converter plunger 411 presses the relief cone 43 off its relief cone seat 424 counter to the pressure prevailing in the inner chamber 441. As a result, the pressure which is present in the inner chamber 441, the first chamber 44, the control passage 5 and the upper space 31 is of the control part 3 can escape through the interior of the cylindrical extension of the filling cone 42. The pressure is reduced via the upper half-space 452 of the second chamber 45 through a control valve drain 48 which leads out of the control device from the upper half-space 452 of the second chamber 45. Since pressure is then no longer applied to the upper space 31 of the control part 3, the control-part piston 33 is lifted upward off its seat 35 by the pressure which is present in the lower chamber 32. As a result, the pressure in the upper valve space 211 of the safety valve 2 is reduced via the relief line 81 and the outlet line 83. The safety valve 2 opens.

When the safety valve 2 opens, the path to the steam outlet line 92 becomes clear. The pressure in the pressure vessel 1 falls. As a result, the pressure in the lower half-space 451 of the second chamber 45 of the control valve 4 is relieved, since pressure compensation takes place through the connection line 7 between this half-space and the pressure vessel 1. On account of the spring force of the spring 415, the converter piston 412 is pressed downward in accordance with the fall in pressure in the lower-space 451. The seat stop 422 of the filling cone 42 remains on the (upper) filling cone seat 463. On the underside of the seat stop 422 it experiences a hydraulic force which presses it upward counter to its force of gravity. The hydraulic force results from the fact that once again pressure is applied to the space below the seat stop 422 via the connection line 6, while the first chamber 44 and the inner chamber 441, as before, are free from pressure.

Although the hydraulic closure force acting on the filling cone seat 463 is reduced toward the bottom by the hydraulic force acting on the sealing element 465, a resultant force in the closure direction of the filling cone 42 continues to exist, since the cross section of the filling cone seat 463 is larger than the cross section sealed by the sealing element 465. p As a result of the pressure-displacement converter 41 and therefore its converter plunger 411 being lowered, the relief cone 43 is lowered back onto the relief cone seat 424, driven by its spring 433. As a result, the first chamber 44, the inner chamber 441, the control passage 5 and the upper space 31 of the control part 3 are separated from the control valve drain 48 leading outward. In this state, there is no change in pressure in those spaces.

As the pressure in the pressure vessel 1 falls further to the standard pressure of, for example, 150 bar, the pressure-displacement converter, 41 is moved further downward by the spring 417, until ultimately its claws 413 engage in the claws 421 of the filling cone 42 and the latter is detached from its upper filling cone seat 463. At this moment, the pressure of the pressure vessel 1 extends via the connection line 6 into the first chamber 44, the inner chamber 441, the control passage 5 and the upper space 31 of the control part 3. The seat stop 422 of the filling cone 42 is pressed onto the filling cone stop 462. Moreover, the frustoconical lower end 34 of the control-part piston 33 is pressed onto its seat 35. As a result, the outlet line 83 is closed off from the relief line 81. Pressure builds up in the relief line 81 and in the upper valve space 211 via the hole 214, and this pressure presses the valve cone 218 against the cone seat 219. The safety valve 2 closes.

This design leads to the safety valve only opening at a relatively high response pressure of, for example, 176 bar, while it only closes at a relatively low pressure of, for example, 150 bar. This difference in closing pressure is desirable. It effectively prevents alternating opening and closing of the safety valve 2 caused by slight pressure fluctuations.

As explained above with reference to FIGS. 1 and 2, it is possible for a plurality of control parts 3 to be connected in series with the associated control valves 4. The components of the individual control valves are preferably accommodated in a common housing, resulting in a very compact multiple control valve, in this case a tandem control valve. It is almost irrelevant whether the response pressure of the individual control valves is identical or different. To prevent any interference between the two control parts of the multiple control valve, in this case the tandem control valve, it is advisable for the response pressures to be selected so that they differ by a few bar.

We claim:

1. An assembly, comprising:
   a fitting communicating with a control line and being opened by pressure imposed via said control line;
   a control device having at least two spring-loaded control valves each actuating a dedicated control part, for opening said fitting by pressure imposed via said control line;
   wherein said control parts are arranged at said control line and are configured to open said fitting only when all said control parts are in a position in which a load is imposed on said fitting, and said control parts closing said fitting as soon as a single one of said control parts is in a position relieving the load on said fitting.

2. The assembly according to claim 1, wherein said control parts contain valves actuated by said control valves and are connected in series in said control line.

3. The assembly according to claims 1, wherein said fitting is a safety valve.

4. The assembly according to claim 1, wherein said respective control valves and said control parts are configured substantially identically.

5. The assembly according to claim 1, which further comprises a filling cone and a relief cone, and wherein at least one of said control valves has a pressure-displacement converter mechanically connectible to said filling cone and to said relief cone and being displaced in the same direction by said converter;

wherein said filling cone is displaceably disposed in a first chamber by a relatively low force onto an associated filling cone seat, for blocking off a pressure-carrying connection line opening out into said first chamber from an intermediate passage in said control part;

wherein said relief cone is disposed in another chamber of said filling cone, such that said relief cone can be lifted off said relief cone seat by a relatively greater force of said converter and, upon being lifted off said relief cone seat, said relief cone connecting said intermediate passage in said control part and said first chamber to a control valve drain.

6. The assembly according to claim 5, which comprises a common shaft, whereby said pressure-displacement converter, said filling cone, and said relief cone are arranged and can be displaced on said common shaft.

7. The assembly according to claim 6, which comprises a converter plunger having a bottom end and an upper end, wherein said pressure-displacement converter is connected to said bottom end of said converter plunger, and said upper end of said converter plunger is disposed beneath and in an immediate vicinity of said relief cone and is displaceable to touch said relief cone, wherein said converter plunger is guided in an extension of said filling cone, and wherein said other chamber having the relief cone seat is formed in an interior of said filling cone.

8. The assembly according to claim 1, wherein said control valves and said control parts are actuated by a pressure medium from a pressure vessel having an outlet line containing said fitting.

\* \* \* \* \*